United States Patent
Yeo et al.

(10) Patent No.: US 12,097,649 B2
(45) Date of Patent: Sep. 24, 2024

(54) DIRECTLY INJECTION-MOLDED STEERING WHEEL DAMPER AND MANUFACTURING METHOD THEREOF

(71) Applicant: AIA CO., LTD., Gyeonggi-do (KR)

(72) Inventors: Tae Ho Yeo, Daegu (KR); Sang Ho Seok, Daegu (KR); Sung Soo Jin, Incheon (KR)

(73) Assignee: AIA CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/951,300

(22) Filed: Sep. 23, 2022

(65) Prior Publication Data

US 2024/0100752 A1    Mar. 28, 2024

(51) Int. Cl.
| | |
|---|---|
| B62D 7/22 | (2006.01) |
| B29C 45/14 | (2006.01) |
| B29C 45/26 | (2006.01) |
| B29C 45/72 | (2006.01) |
| B60R 21/203 | (2006.01) |
| B62D 1/04 | (2006.01) |
| B62D 1/11 | (2006.01) |
| F16F 15/073 | (2006.01) |
| B29L 31/00 | (2006.01) |
| B29L 31/30 | (2006.01) |

(52) U.S. Cl.
CPC .... *B29C 45/2602* (2013.01); *B29C 45/14065* (2013.01); *B29C 45/14221* (2013.01); *B29C 45/7207* (2013.01); *B62D 1/11* (2013.01); *B29L 2031/3047* (2013.01); *B29L 2031/721* (2013.01)

(58) Field of Classification Search
CPC .......... B29C 45/2602; B29C 45/14065; B29C 45/14221; B29C 45/7207; B62D 1/11; B29L 2031/3047; B29L 2031/721

USPC ........................................................... 74/552
See application file for complete search history.

(56) References Cited

U.S. PATENT DOCUMENTS

| | | | | |
|---|---|---|---|---|
| 5,692,770 | A | * 12/1997 | Scharboneau | B62D 1/10 74/552 |
| 2005/0011713 | A1 | * 1/2005 | Yasumoto | F16F 7/108 188/373 |
| 2007/0068335 | A1 | * 3/2007 | Jaarda | B62D 1/11 74/552 |

(Continued)

FOREIGN PATENT DOCUMENTS

| | | | |
|---|---|---|---|
| EP | 3812240 A1 * | 4/2021 | ......... B60R 21/2037 |
| KR | 20050066146 | 6/2005 | |

(Continued)

OTHER PUBLICATIONS

Machine translation of KR 102134821 B1, Yeo et al., Aug. 3, 2020 (Year: 2020).*

(Continued)

*Primary Examiner* — Vinh Luong
(74) *Attorney, Agent, or Firm* — IPLA P.A.

(57) ABSTRACT

A steering wheel damper for a vehicle, and a manufacturing method thereof, the method includes putting a plate which is directly fixed to a steering wheel and has a plurality of through holes and a mass member having a predetermined weight to reduce vibration and a central pin in a mold in order, injection-molding rubber, and molding a connection member for connecting the plate and the mass member and a cushion member for limiting movement of the mass member.

4 Claims, 9 Drawing Sheets

(56) References Cited

U.S. PATENT DOCUMENTS

| | | | | |
|---|---|---|---|---|
| 2012/0043171 | A1* | 2/2012 | Sella | F16F 7/116 |
| | | | | 188/379 |
| 2020/0339192 | A1* | 10/2020 | Myklebust | B60R 21/2037 |
| 2023/0174153 | A1* | 6/2023 | Johansson | F16F 1/38 |
| | | | | 280/731 |

FOREIGN PATENT DOCUMENTS

| | | | | |
|---|---|---|---|---|
| KR | 20140042162 A | * | 4/2014 | F16F 7/003 |
| KR | 20180114572 A | * | 10/2018 | B62D 7/222 |
| KR | 102134821 B1 | * | 8/2020 | B62D 7/222 |

OTHER PUBLICATIONS

Machine translation of KR 20180114572 A, Yeo et al., Oct. 19, 2018 (Year: 2018).*

Machine translation of KR 20140042162 A, Kim, Apr. 7, 2014 (Year: 2014).*

* cited by examiner

DIRECTLY INJECTION-MOLDED STEERING WHEEL DAMPER AND MANUFACTURING METHOD THEREOF

BACKGROUND

The present invention relates to a damper assembled to a steering wheel, which is a steering device of a vehicle, to attenuate vibration transmitted to the steering wheel, and more particularly, to a damper which includes a plate and a mass member integrated by a direct injection-molding method so that the mass member is firmly combined not to be separated even if vibration is generated or a vehicle is shaken, thereby preventing noise and vibration caused by collision with surrounding parts.

As noted above, a steering mechanism is a device to change a driving direction by moving the wheels of a vehicle laterally, and is used as a steering wheel, a handle, a steering handle, a driving wheel, and the like.

In a case of a steering wheel, which is a handle for driving a vehicle, various vibrations are generated in a rotational direction and in a radial direction due to a condition of a road surface such as a mound or a hole, a structure of a vehicle body, a structure of a mounting system, unevenness of tires (wheels), and the like, and such vibrations are transferred to the steering wheel.

The vibrations transmitted to the steering wheel is also transmitted to a driver who is driving the vehicle, and so, it causes displeasure, reduces ride comfort, and increases fatigue due to continuous vibrations, so that the driver feels inconvenience in driving.

Moreover, since the steering system, which is a relevant component of the steering wheel, is exposed to vibration for a long period of time, its durability is reduced and safety is reduced due to simmy vibration, which is vibration that the driver feels at a certain high speed during driving, namely, a vibration of the entire steering device of the vehicle. So, in a case in which the steering system is exposed to vibration for a long period of time, it disrupts safe driving.

In order to solve the above problems, a damper having a mass (a weight) is additionally assembled to the steering wheel so as to reduce vibration transmitted to the steering wheel.

Such a conventional damper is disposed between a mass member and a plate, and a rubber member for transferring vibration to the damper is adhered or assembled to the damper.

However, the rubber adhering method has several disadvantages in that productivity is deteriorated since it requires lots of processes, such as prior processes of short, preprocessing, application of adhesives, and the like, and a post-process of removing burrs after adhesion of rubber, and in that the mass member is vibrated continuously and is separated from the damper as soon as the adhesive is dried as time goes on.

Furthermore, in a case of an assembly method of forcibly fitting a rubber product, the rubber product is continuously shaken and is separated at some time since getting torn when coming into contact with a sharp edge or burr and since the fixing is not perfect.

In addition, due to negative influences, such as a mound, a sunken road surface, a rough road, strong wind, and the like, the vehicle which is being driven is shaken greatly and the mass member is also shaken and is separated from the plate or collides with the surrounding components located in the vicinity, thereby causing noise and vibration and damaging components.

Patent Document 1: Korean Patent Laid-open No. 10-2005-0066146

SUMMARY OF THE INVENTION

Accordingly, the present invention has been made to solve the above-mentioned problems occurring in the prior arts, and it is an object of the present invention to provide an improved damper so that a mass member is firmly coupled not to be separated from the damper, thereby reducing vibration transmitted to a steering wheel, being firmly coupled not to collide with surrounding components or not to be separated by shaking together with a vehicle when the vehicle is greatly shaken by negative influences such as a rough road, strong wind, and the like, and simplifying a production process to improve productivity.

To accomplish the above object, according to the present invention, there is provided a directly injection-molded steering wheel damper and a manufacturing method thereof. A connection member which located between a plate directly fixed to a steering wheel and a mass member for reducing vibration, and a cushion member for limiting movement are directly injection-molded in a mold so that an integrated damper is manufactured, thereby simplifying a manufacturing process and improving productivity.

Additionally, in the integrated damper which is directly injection-molded, the connection member firmly fixes and connects the plate and the mass member so that the mass member is not separated from the plate. The cushion member which is directly injection-molded in the same manner as the connection member prevents the mass member from being shaken excessively and being separated from the connection member not to be damaged due to collision with surrounding components and limits movement or a movement range of the mass member, thereby enhancing durability and marketability.

According to an aspect of the present invention, there is provided a damper in which a rubber is combined with a mass member and a plate having a plurality of fixing holes by a direct injection-molding method, thereby reducing vibration transmitted to a steering wheel, being firmly coupled not to collide with surrounding components or not to be separated by shaking together with a vehicle when the vehicle is greatly shaken by negative influences such as a rough road, strong wind, and the like, and simplifying a manufacturing process to improve productivity.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, the present invention will now be described in detail with reference to the accompanying drawings, in which exemplary embodiments of the invention are shown. It should be understood, however, that there is no intent to limit example embodiments of the invention to the particular forms disclosed, but on the contrary, example embodiments of the invention are to cover all modifications, equivalents, and alternatives falling within the technical idea and scope of the present invention.

In addition, although the embodiments of the present disclosure have been described with reference to the embodiments of the present disclosure, it should be appreciated that an effect that can be predicted by the corresponding configuration should also be recognized.

Figure 1:
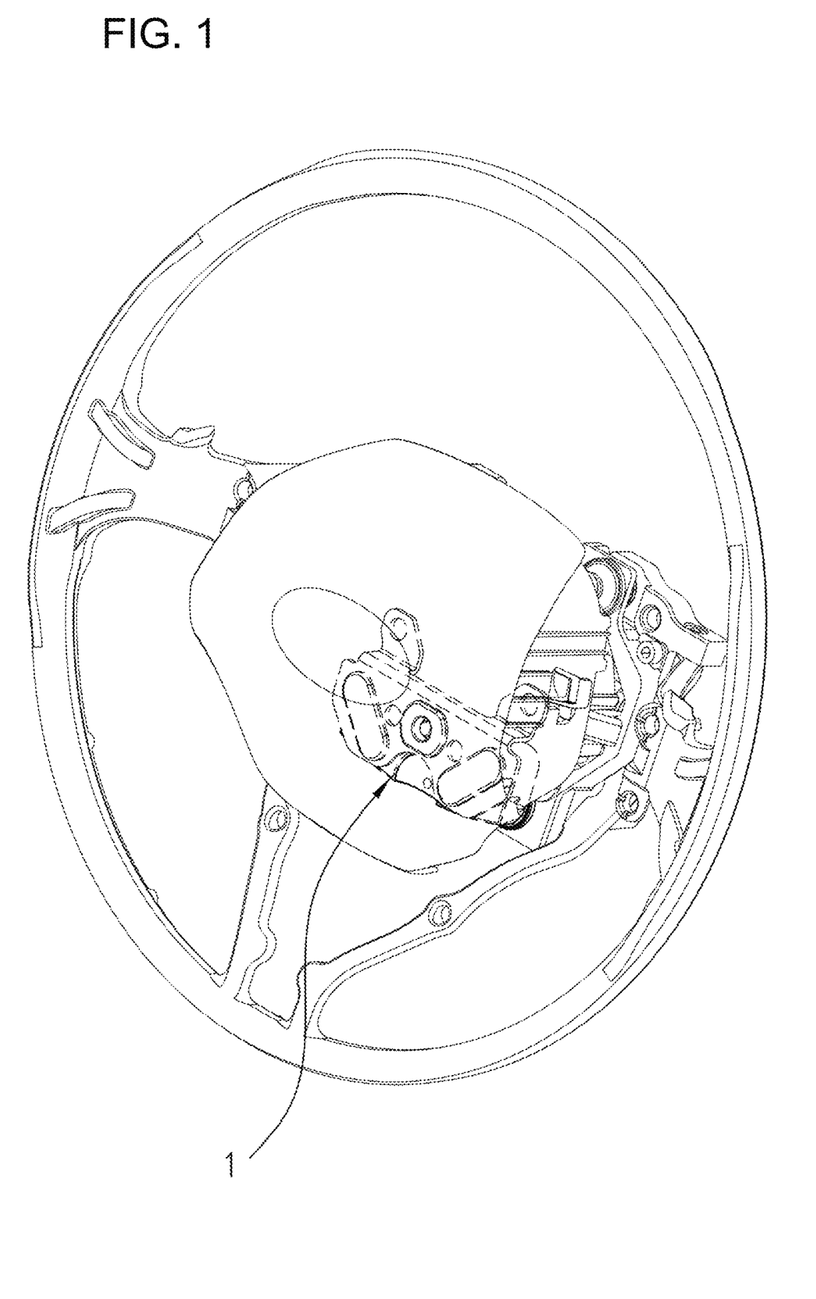
FIG. 1 is a view illustrating a state in which a damper according to the present invention is assembled.
Figure 2:
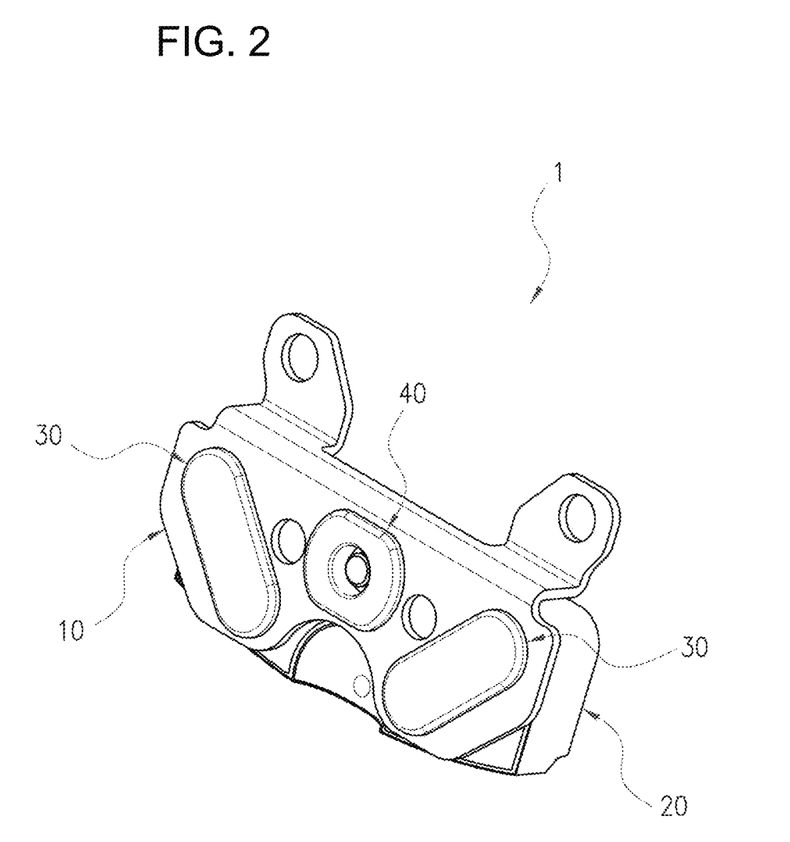
FIG. 2 is a perspective view of the damper according to an embodiment of the present invention.
Figure 3:
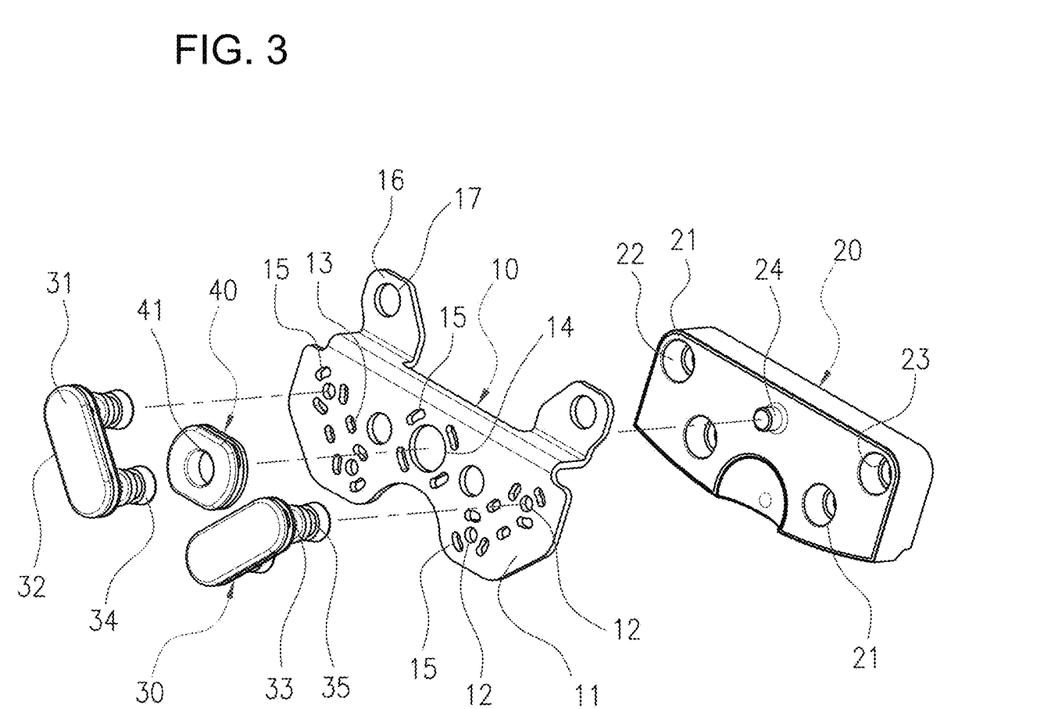
FIG. 3 is an exploded perspective view of the damper according to an embodiment of the present invention.
Figure 4:
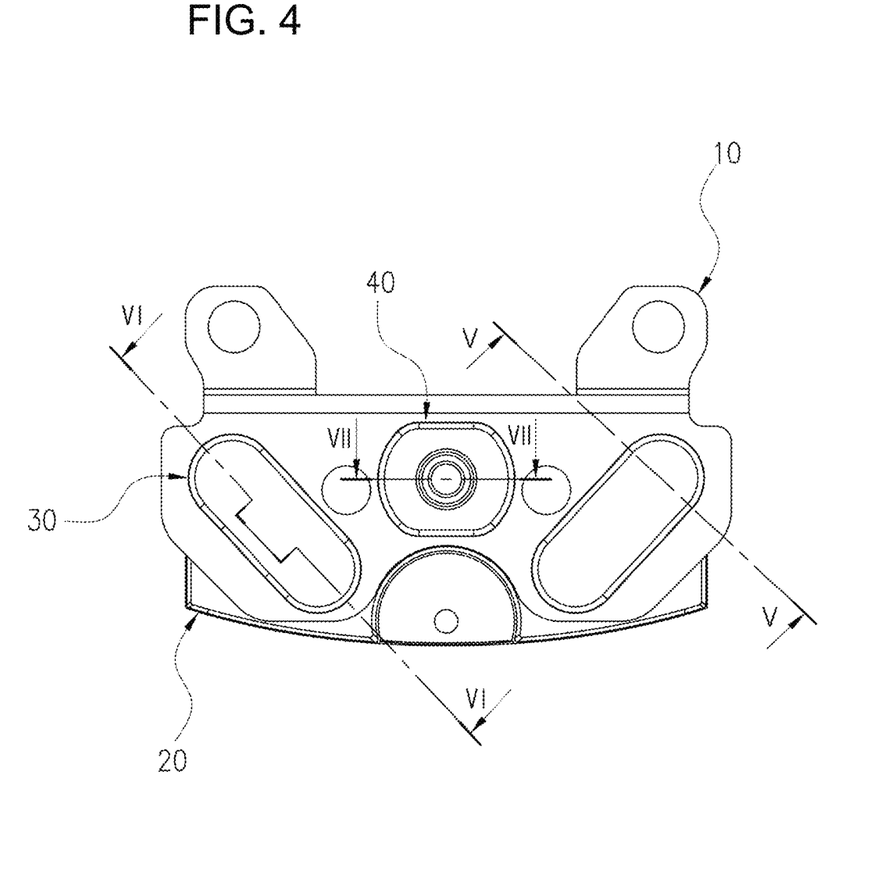
FIG. 4 is a front view of the damper according to an embodiment of the present invention.

A damper 1 of the present invention includes a plate 10 made of a metal material fixed to a steering wheel, a mass member 20 made of a sintered alloy material having a predetermined weight and damping vibration, a rubber-made connection member 30 injection-molded to connect the plate 10 and the mass member 20, and a rubber cushion member 40 configured to restrict movement of the mass member 20, wherein an upper end portion 31 of the connection member 30 is fixed to surround a portion of the outer surface of the plate 10, and a lower end portion 35 is fixedly coupled to the inside of the mass member 20.

The plate 10 includes: assembly portions 16, which are respectively formed on both sides of the upper portion of the plate 10, respectively have assembly holes 17 to be assembled to the steering wheel, and are spaced apart from each other at an appropriate distance not to have any problem in assembly; and a body part 11 which is bent in the form of a '¬' shape so that the assembly portions 16 are connected to the front surface thereof.

An upper end portion 31 of the connection member 30 is fixed to the body portion 11. The body portion 11 includes: main through holes 12 which becomes a central axis to firmly fix the connection member 30 by widening the area of the connection member 30 getting in contact with the plate 10; auxiliary through holes 15 formed to surround the main through holes 12; and additional through holes 13 additionally formed to improve absorption of vibration and coupling force by the upper end portion 31 widened on the plate 10.

Furthermore, the body portion 11 further includes: a central through hole 14 formed at the central portion thereof to prevent a collision by limiting the movement of the mass member 20; and auxiliary through holes 15 formed to surround the central through hole 14 so as to firmly fix the cushion member 40 like the main through holes 12.

Figure 5:
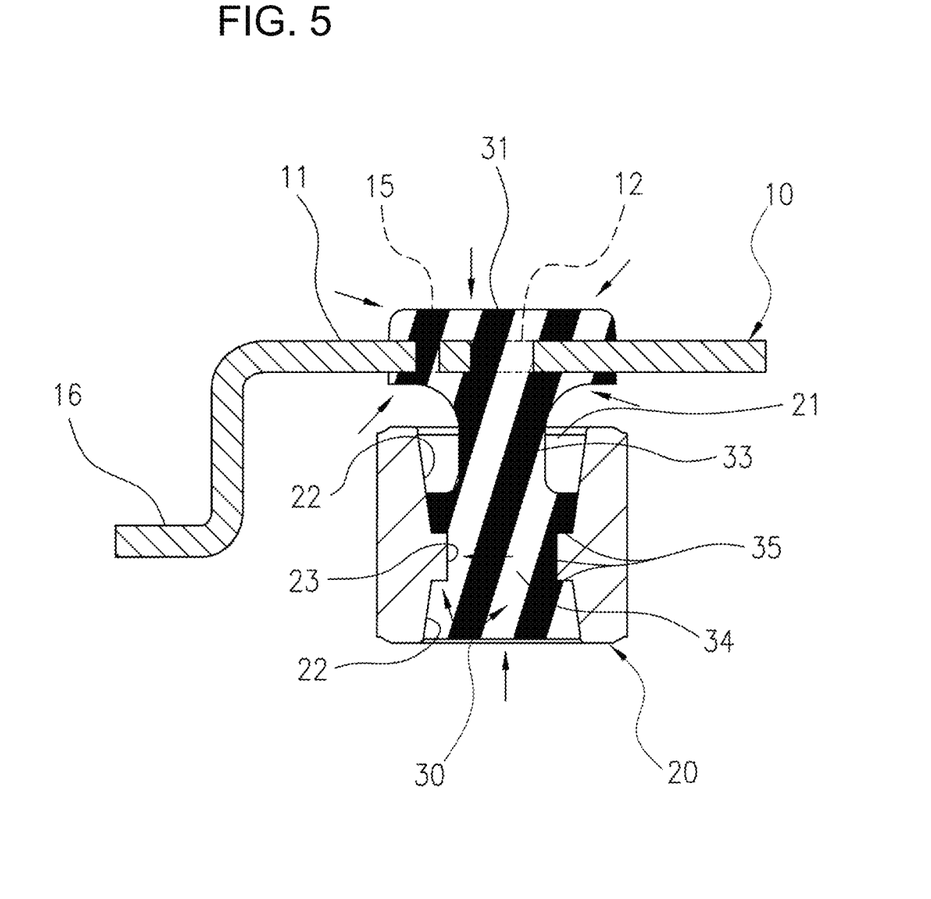
FIG. 5 is a partial cross-sectional view taken along the line V-V of FIG. 4.

The mass member 20 has a predetermined weight to reduce vibration, and includes a fixing hole 21 having the same central axis as the main through hole 12. The fixing hole 21 includes: inclined surfaces 22 inclined at a predetermined angle in which the diameter of the fixing hole 21 gradually decreases from the upper and lower surfaces to the center inside the fixing hole 21; and a jaw 23 for fixing the lower end portion 35 of the connection member 30 at a center point where the inclined surfaces 22 cross each other.

Figure 6:
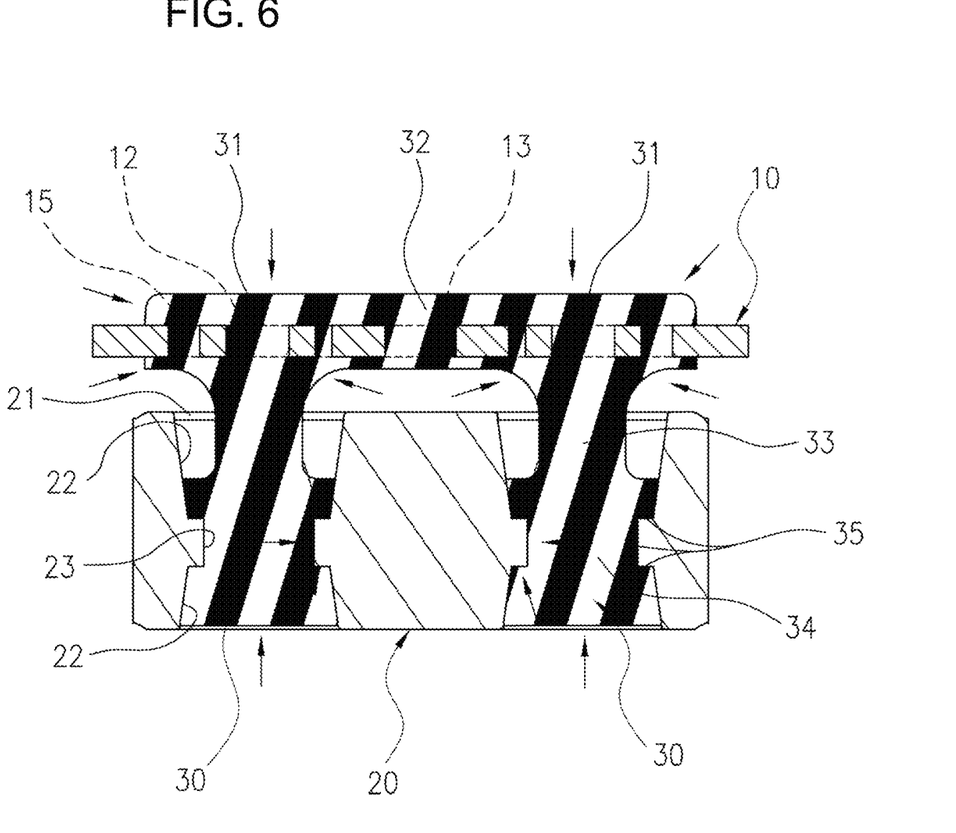
FIG. 6 is a partial cross-sectional view taken along the line VI-VI of FIG. 4.

A central pin 24 having a diameter smaller than the inner diameter of the cushion member 40 is formed on the front surface of the mass member 20 to be located on the same central axis as the central through hole 14, and is positioned inside the cushion member 40 fixed to the central through hole 14.

The connection member 30 is made of a rubber material having elasticity, and includes: an upper end portion 31 fixed to the plate 10; a lower end portion 35 fixed to the mass member 20; and a connection portion 33 connecting the upper end portion 31 and the lower end portion 35 in order to simultaneously fix and couple the plate 10 and the mass member 20.

The upper end portion 31 partially covers and surrounds the outer portion of the plate 10 and passes through the main through hole 12 and the auxiliary through hole 15 so as to cover and connect even a portion of the outside of the opposite side.

Figure 7:
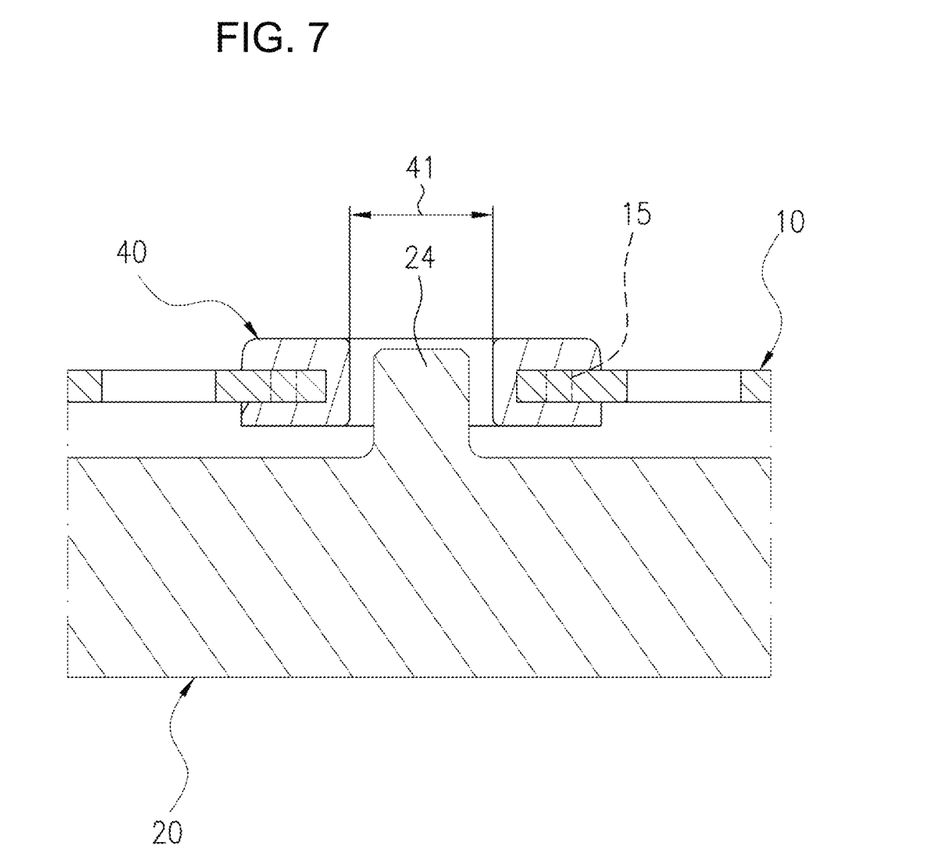
FIG. 7 is a partial cross-sectional view taken along the line VII-VII of FIG. 4.

In addition, an extension portion 32 positioned between the upper end portion 31 and the upper end portion 31 covers and surrounds a portion of the outside of the plate 10 in the same manner as the upper end portion 31, and is connected to the additional through hole 13 so as to widen an area getting in contact with the body portion 11, thereby effectively reducing vibration and being firmly fixed to the body portion by absorbing and transmitting vibration transmitted to the plate 1.

The lower end portion 35 also has a large contact area in the fixing hole 21 of the mass member 20 so that the vibration can be easily transferred to the mass member 20, and the lower end portion 35 strongly contracts toward the central portion according to the shape characteristics of the inclined surface 22 and is firmly fixed to the jaw 23 to be firmly fixed.

The connection portion 33 is connected between the upper end portion 31 and the lower end portion 35 such that the plate 10 and the mass member 20 are spaced apart from each other by a predetermined distance, and transmits the vibration absorbed by the upper end portion 31 and the extension portion 32 to the mass member 20 to be attenuated.

The cushion member 40 has the same central axis as the central through hole 14 of the plate 10 and is fixed to surround a portion of the outside of the plate 10. In the same way, the cushion member 40 is prevented from being separated since being firmly fixed by the auxiliary through holes 15, and limits movement of the mass member 20 to be able to move only in an internal space 41 not to be shaken greatly and not to cause noise and vibration or not to be damaged by collision with the plate 10 or the surrounding components.

A manufacturing method and operation of the damper according to the present invention will now be described.

Figure 9:
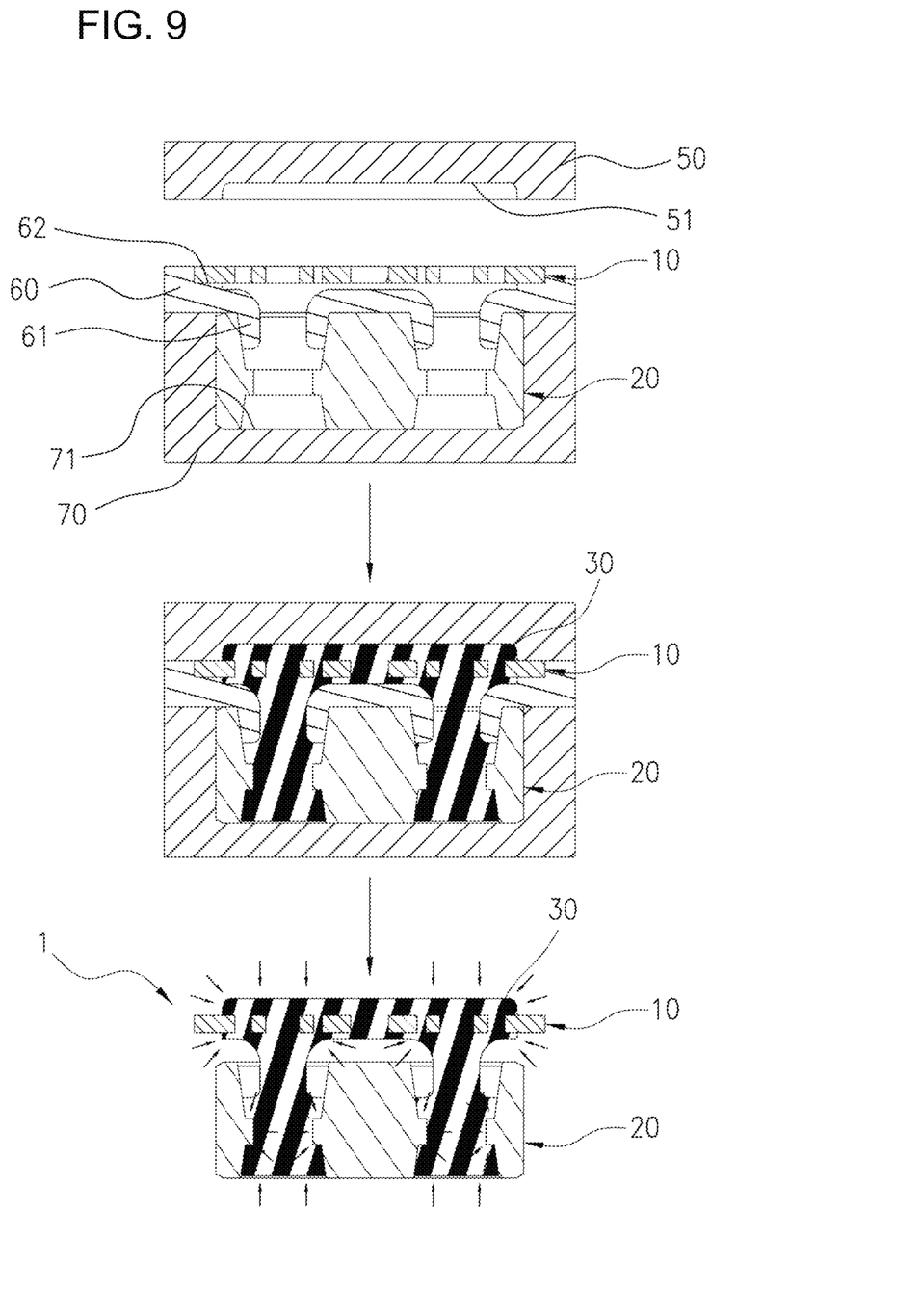
FIG. 9 is a flow chart illustrating a manufacturing process of the damper according to an embodiment of the present invention

The prepared mass member 20 is put into a lower mold 70, a middle mold 60 and the plate 10 are sequentially put on the mass member 20, an upper mold 50 is closed, and then, the rubber material is directly injection-molded to form the damper 1 in a form in which the plate and the mass member are integrated.

More specifically, the mass member 20 is seated on a seating portion 71 of the lower mold 70, and a middle molding portion 61 of the middle mold 60 is placed in the fixing hole 21 of the mass member 20 to face the inclined surface 22, and then, the plate 10 is seated on a separation portion 62 positioned higher than the middle molding portion 61.

When the middle mold 60 and the plate 10 are prepared, the upper end portion 31, the extension portion 32, and the upper mold 50 having the upper molding portion 51 to mold the cushion member 40 get in close contact with the middle mold 60 so as to injection-mold rubber at high temperature.

When rubber is injection-molded, an empty space of the molds 50, 60 and 70 are filled to form the connection member 30 and the cushion member 40.

As described above, the damper 1, in which the connection member 30 and the cushion member 40 are fixed and coupled by injection-molding, separates the damper 1 from the molds 50, 60, and 70 and cools the damper.

More specifically, the connection member 30 and the cushion member 40, which are injection-molded at high temperature, are increased in volume by thermal expansion, and then, are cooled during a proper period of time or at a proper temperature in an incomplete state in which a defect may occur, for instance, the connection member 30 and the cushion member 40 are separated or deformed.

In this instance, in the cooled damper 1, the upper end portion 31, the connection portion 33 and the extension portion 32 adjacent to the upper end portion 31 are contracted based on the plate 10, and the lower end portion 35 is contracted based on a portion of the connection portion 33 adjacent to the lower end portion 35 and the jaw 23. In this instance, since the volume is reduced and the density is increased due to the inclined surface 22 gradually narrowed toward the jaw 23 during the contraction, the contracted surface strongly comes into contact with three surfaces of the jaw 23, so that the damper is fixed more firmly.

The damper 1 according to the present invention does not require prior processes, such as short, preprocessing, application of adhesives, and the like, to adhere rubber between the plate and the mass member, and a postprocess of removing burrs after cooling, thereby simplifying the manufacturing process and improving productivity.

Figure 8:
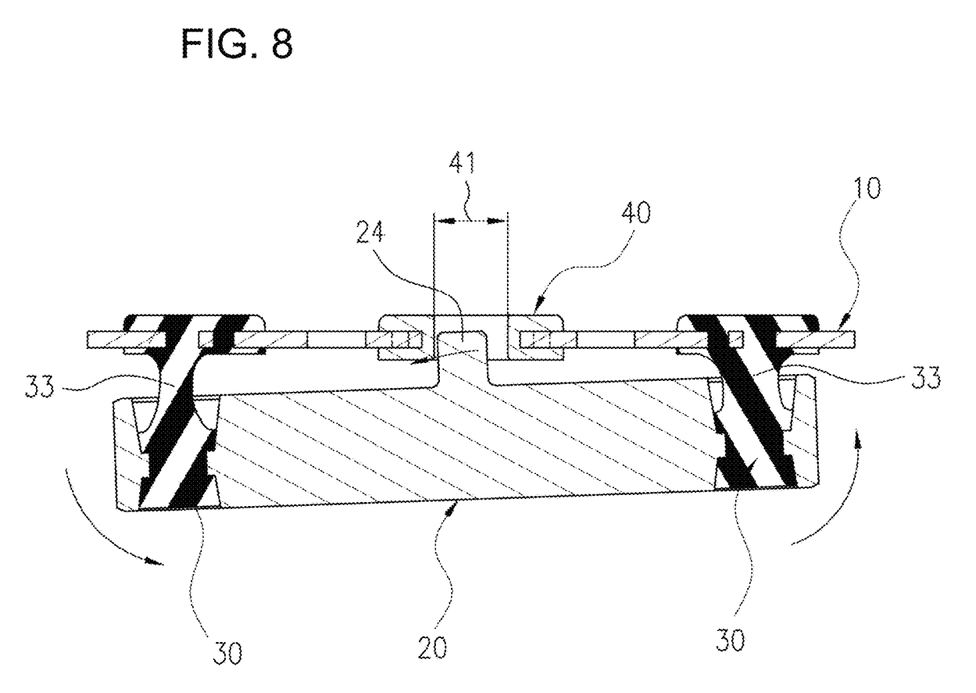
FIG. 8 is a view illustrating an operation of limiting the movement of the damper according to an embodiment of the present invention.

In addition, the connection member 30 and the mass member 20 are not separated even if the vehicle is shaken greatly since being firmly coupled on the plate 10 which is directly connected and fixed to the steering wheel, and the cushion member 40 limits the movement of the mass member 20, thereby preventing noise and vibration by collision with surrounding components and preventing a damage of the damper.

What is claimed is:

1. A method for manufacturing a directly injection-molded steering wheel damper, which includes a lower mold on which a mass member is seated, a middle mold on which a plate is seated and which is spaced apart from the mass member at a predetermined interval, and an upper mold completely getting in contact in order to injection-mold a connection member and a cushion member, the method comprising the steps of:
   putting the mass member on a seating portion inside the lower mold;
   putting a middle molding portion, which touches an inclined surface of a fixing hole to mold a connection portion of the connection member, and the plate on the lower mold on which the mass member is put, and putting the plate and the middle mold, which has a separation portion to be spaced apart from the mass member at a predetermined interval; and
   closely putting the upper mold, which has an upper molding portion to mold the connection member and the cushion member, on the middle mold on which the plate is seated, and injection-molding rubber to make a damper having the connection member and the cushion member.

2. The manufacturing method according to claim 1, wherein the connection member includes an upper end portion and an extension portion positioned on the plate to surround a portion of the outside of the plate and to be connected to main through holes, additional through holes, and auxiliary through holes of the plate, a lower end portion of the connection member is formed along the internal shape of the fixing hole of the mass member, and
   wherein when the damper on which the connection member is injection-molded is cooled, the upper end portion and the extension portion are contracted based on the plate and the lower end portion is contracted based on a jaw of the mass member, so that the volume is reduced and the density is increased due to the inclined surface of the fixing hole, thereby firmly coupling the connection member.

3. The manufacturing method according to claim 1, wherein the cushion member is formed at a central through hole of the plate to surround a portion of the outside of the plate and to be connected via the auxiliary through holes, and a central pin of the mass member is located in an internal space of the cushion member, and
   wherein when the mass member is shaken greatly, the central pin first collides with the cushion member to limit the movement of the mass member.

4. A steering wheel damper for a vehicle comprising:
   a plate directly mounted on a steering wheel,
   a mass member having a predetermined weight to attenuate vibration,
   a connection member coupled to the plate to be spaced apart from the mass member at a predetermined interval, and
   a cushion member coupled to the plate to limit the movement of the mass member in order to attenuate vibration generated and transmitted during traveling of the vehicle,
   wherein an upper end portion of the connection member is fixed while partially surrounding an extension portion and a body portion of the plate, and a lower end portion is fixed to a fixing hole of the mass member so that the damper is firmly combined without being separated.

* * * * *